(12) United States Patent
Abiezzi et al.

(10) Patent No.: US 10,303,497 B2
(45) Date of Patent: May 28, 2019

(54) HYBRID SOFTWARE AND GPU ENCODING FOR UI REMOTING

(71) Applicant: VMware, Inc., Palo Alto, CA (US)

(72) Inventors: Salim Abiezzi, Sammamish, WA (US); Sandro Moiron, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/630,556

(22) Filed: Jun. 22, 2017

(65) Prior Publication Data
US 2018/0373546 A1    Dec. 27, 2018

(51) Int. Cl.
| | |
|---|---|
| *G06T 9/00* | (2006.01) |
| *G06F 9/451* | (2018.01) |
| *G06T 15/00* | (2011.01) |
| *H04L 29/06* | (2006.01) |

(52) U.S. Cl.
CPC .............. *G06F 9/452* (2018.02); *G06T 9/00* (2013.01); *G06T 15/005* (2013.01); *H04L 67/42* (2013.01); *G06T 2200/24* (2013.01)

(58) Field of Classification Search
CPC ............ G06F 9/452; G06F 2009/4557; G06F 3/1454; H04L 65/607; H04L 67/025; A63F 13/12; A63F 2300/407; A63F 2300/552; A63F 13/355; A63F 13/35; A63F 2300/51; H04N 19/436; H04N 19/42; H04N 5/23229; H04N 19/127; H04N 19/156; H04N 19/172; H04N 19/176; H04N 19/167; H04N 21/2365; H04N 19/00; G06T 13/20; G06T 17/00; G06T 19/00; G06T 2200/04; G06T 2200/28; G06T 2207/10016
See application file for complete search history.

(56) References Cited

U.S. PATENT DOCUMENTS

| | | | |
|---|---|---|---|
| 2011/0090304 A1* | 4/2011 | Song .................. | H04N 21/4821 348/42 |
| 2011/0314093 A1* | 12/2011 | Sheu ..................... | G06F 9/4445 709/203 |
| 2015/0194128 A1* | 7/2015 | Hicok ...................... | G09G 5/12 345/428 |
| 2017/0054987 A1* | 2/2017 | Rangarajan .......... | H04N 19/167 |

* cited by examiner

*Primary Examiner* — Haixia Du
(74) *Attorney, Agent, or Firm* — Patterson & Sheridan LLP

(57) ABSTRACT

Frames of a virtual desktop are encoded using a hybrid approach that combines the strength of software encoding by a central processing unit (CPU) and hardware encoding by a graphics processing unit (GPU). A method of encoding frame data of one or more virtual desktops in hardware and in software and transmitting the encoded frame data to one or more client devices, includes the steps of encoding a first portion of the frame data in the GPU to generate a first encoded frame data, encoding a second portion of the frame data in software, i.e., programmed CPU, during encoding of the first portion, to generate a second encoded frame data, and transmitting the first encoded frame data and the second encoded frame data from a host computer of the one or more virtual desktops to the one or more client devices as separate video streams.

18 Claims, 5 Drawing Sheets

HYBRID SOFTWARE AND GPU ENCODING FOR UI REMOTING

BACKGROUND

Desktop virtualization is software technology that separates the desktop environment and associated application software from a client computing device that is used to access it. Virtual desktop infrastructure (VDI) implements desktop virtualization using virtual machines (VMs). In VDI, the desktop environment and associated application software are executed in a VM which runs on a remote host computer. The virtual desktop is generated at the host computer and display frames of the virtual desktop are transmitted from the host computer to the client computing device so that they can be displayed at the client computing device. User inputs are made at the client computing device and such inputs are transmitted to the host computer for processing by the host computer.

Remote display protocols for efficiently delivering the frames of the virtual desktop from the host computer to client computing devices have been developed. PC over IP (PCoIP) is one such remote display protocol. According to PCoIP, the frames are encoded at the host computer, typically using a central processing unit (CPU) of the host computer, to capture only regions of the virtual desktop that have changed, and the encoded frame data is transmitted to the client computing device as a pixel stream.

VMware Blast® is another remote display protocol. The VMware Blast encodes the frames according to the H.264 video encoding standard and the encoded data is transmitted to the client computing device as a standard video stream instead of a pixel stream. The VMware Blast protocol can be implemented on either the CPU or a graphics processing unit (GPU) of the host computer.

SUMMARY

One or more embodiments provide a hybrid approach for encoding frames of the virtual desktop that combines the strength of both software encoding by the CPU and hardware encoding by the GPU. According to one embodiment, a method of encoding frame data of one or more virtual desktops in hardware and in software and transmitting the encoded frame data to one or more client devices, is provided. The method includes the steps of encoding a first portion of the frame data in the GPU to generate a first encoded frame data, encoding a second portion of the frame data in software, i.e., programmed CPU, during encoding of the first portion, to generate a second encoded frame data, and transmitting the first encoded frame data and the second encoded frame data from a host computer of the one or more virtual desktops to the one or more client devices as separate video streams.

Further embodiments include, without limitation, a non-transitory computer-readable storage medium that includes instructions for a processor to carry out the above method, and a computer system that includes a processor programmed to carry out the above method.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
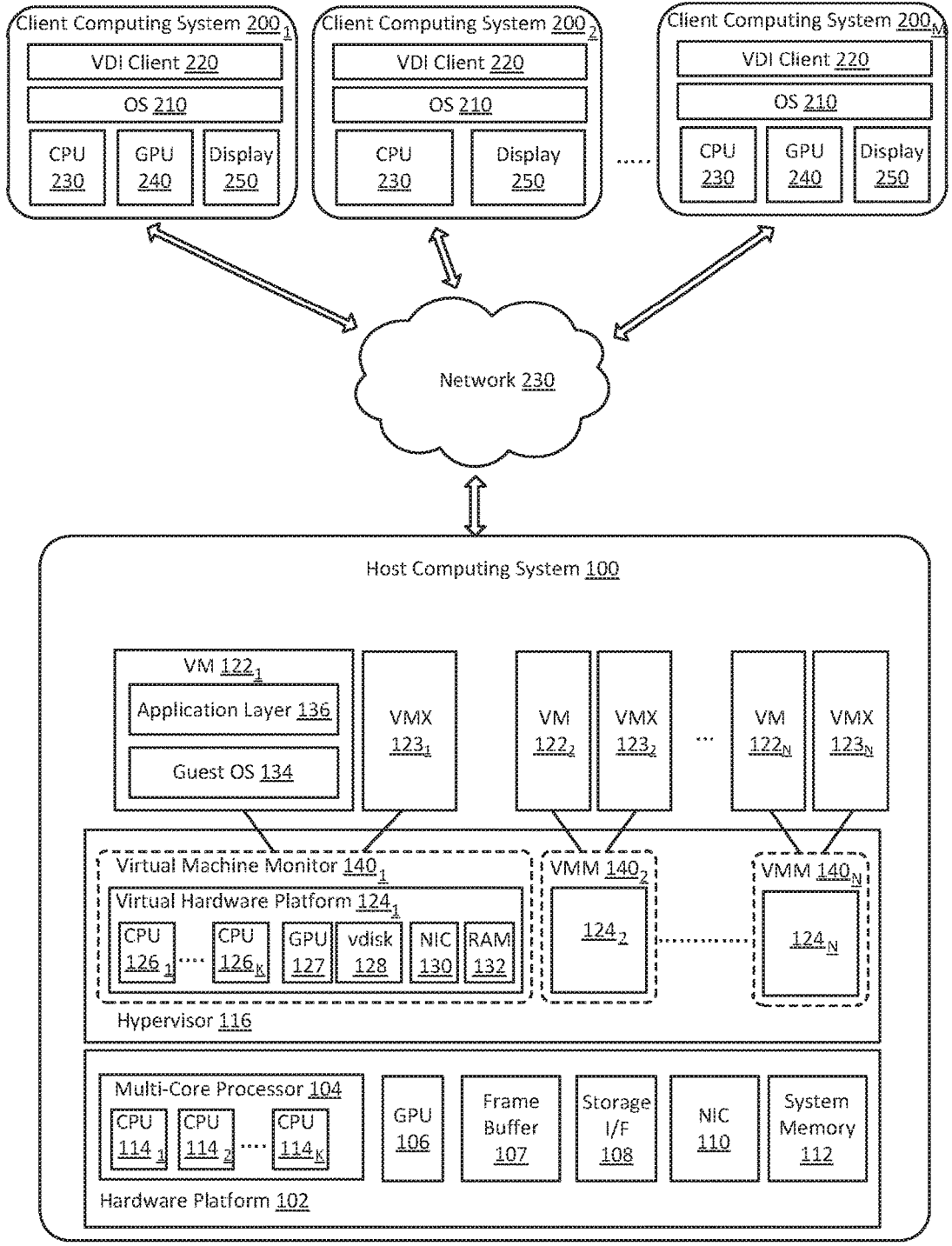
FIG. 1 is a block diagram of a virtual desktop infrastructure in which embodiments may be implemented.

FIG. 1 is a block diagram of a host computing system 100 that provides a virtual desktop infrastructure (VDI) to one or more client computing systems $200_1$-$200_M$ that are connected to the host computing system 100 through a network 230. The host computer system 100 may be constructed on a desktop, laptop, or server grade hardware platform 102 such as an x86 architecture platform. The hardware platform 102 includes a multi-core processor 104, a graphic processing unit (GPU) 106, a frame buffer 107, a storage interface 108, such as host bus adapter by which a connection is made to storage device (e.g., a hard disk drive or a solid state drive), a network adapter (NIC) 110, a system memory 112, and other I/O devices such as, for example and without limitation, a mouse and keyboard (not shown in FIG. 1). The multi-core processor 104 includes a plurality of central processing units (CPUs) $114_1$ to $114_K$ which can operate concurrently and can read and write data to the system memory 112.

A virtualization software layer, also referred to hereinafter as a hypervisor 116, is installed on top of the hardware platform 102. The hypervisor 116 supports a virtual machine execution environment in which one or more VMs (depicted in FIG. 1 as VMs $122_1$-$122_N$, hereinafter individually or collectively referred to as VM 122) may be concurrently instantiated and executed. In the embodiment depicted herein, the virtualization execution environment is provided through both a user mode process executing in a less privileged state, referred to as the VMX process (e.g., VMX processes $123_1$-$123_N$) and a virtual machine monitor (VMM) executing in a more privileged state (e.g., VMM $140_1$-$140_N$). Each VM 122 effectively executes in the process space of its respective VMX process 123 (i.e., its memory is mapped to each respective VMX process).

In addition, for each VM 122, the hypervisor 116 manages a corresponding virtual hardware platform (i.e., virtual hardware platforms $124_1$-$124_N$ implemented in VMMs $140_1$-$140_N$, respectively) that includes emulated hardware elements such as multiple virtual CPUs $126_1$ to $126_K$, a virtual disk (vdisk) 128, a virtual NIC 130, and a virtual RAM 132. For example, the virtual hardware platform $124_1$ may function as an equivalent of a standard x86 hardware architecture, such that any x86 supported operating system, e.g., Microsoft Windows®, Linux®, Solaris® x86, NetWare, FreeBSD, etc., may be installed as a guest operating system 134 to execute any supported applications in an application layer 136 for the VM $122_1$. The guest operating system 134 of the VM $122_1$ includes device drivers (e.g., pre-existing device drivers available for the guest operating system 134 etc.) that interact with emulated hardware elements in the virtual hardware platform $124_1$ as if such emulated hardware elements were actual physical devices. The hypervisor 116 is responsible for transforming requests from device drivers in the guest operating system 134 that are received by emulated hardware elements in the virtual platform $124_1$ into corresponding requests directed to corresponding physical devices in the hardware platform 102.

The host computing system 100 is connected to one or more client computing systems $200_1$-$200_N$ (individually or collectively referred to as client computing system 200) through the network 230 or further through a connection broker (not shown) that may be provided between the host computing system 100 and the client computing systems $200_1$-$200_N$. Each of the client computing systems $200_1$-$200_M$ can be of a variety of type of computing devices, such as cell phones, tablets, PCs, smart TVs, and includes an operating system (OS) 210 running thereon and a VDI client software program (also referred to as "VDI client" for short), e.g., VDI client 220 that runs on the OS 210. The VDI client 220 provides an interface for an end user to access the virtual desktop, which may be running in one of the VMs $122_1$-$112_N$ in a data center that is remote from the user location. The term, "desktop" refers to the instance of an interactive operating environment provided by a computer operating system and software applications, typically in the form of a display and sound output and keyboard and mouse input. With the VDI client 220, the end user can access the virtual desktop running in a remote data center through the network 230, from any location, using a general purpose computer running a commodity operating system and a VDI client software program such as VMware® View™, or a special purpose thin client such as those available from Dell, HP, NEC, Sun Microsystems, Wyse, and others. In one embodiment, a browser can be used as the VDI client software program based on JavaScript. This browser-type VDI client software program enables cloud-based computing devices, such as chromebooks, to be used as thin clients. The client computing system 200 also includes, as hardware elements, a CPU 230 and a display 250 on which the virtual desktop is displayed. Some of the client computing system 200 may further include a GPU 240 that can be used to decode the encoded frame data of the virtual desktop transmitted from the host computing system 100 on which the corresponding VM 122 runs. If there is no GPU 240 on the client side, the CPU 240 instead handles such decoding tasks on the client side.

It should be recognized that the various terms, layers, and categorizations used to describe the virtualization software and hardware components in FIG. 1 may be referred to differently without departing from their functionality or the spirit or scope of the invention. For example, the virtual hardware platforms $124_1$-$124_N$ may be considered to be part of the virtual machine monitors (VMM) $140_1$-$140_N$ which implement the virtual system support needed to coordinate operations between the hypervisor 116 and their respective VMs. Alternatively, the virtual hardware platforms $124_1$-$124_N$ may also be considered to be separate from the VMMs $140_1$-$140_N$, and the VMMs $140_1$-$140_N$ may be considered to be separate from the hypervisor 116. One example of the hypervisor 116 that may be used is included as a component of VMware's ESX™ product, which is commercially available from VMware, Inc. of Palo Alto, Calif. It should further be recognized that other virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual disks.

In addition, the embodiments described above employ a hardware abstraction layer installed on top of the hardware platform 102. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, the virtual machines (VMs) 122 are used as an example for the virtual computing instances and the hypervisor 116 as an example for the hardware abstraction layer. As described above, each virtual machine 122 includes a guest operating system 134 in which at least one application runs. It should be noted that these embodiments may also apply to other examples of virtual computing instances, such as containers not including a guest operating system, which is referred to as "OS-less containers."

Figure 2:
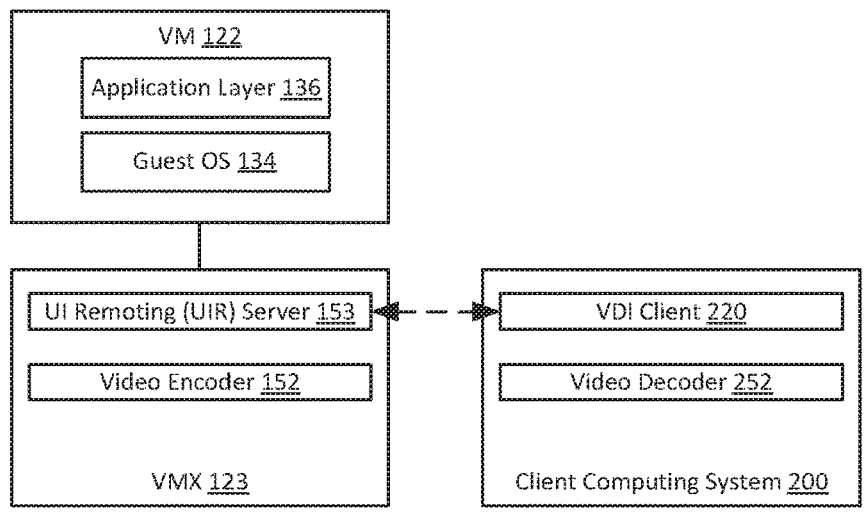
FIG. 2 is a block diagram of components that enable transmission of encoded frame data from the host computing system to the client computing system and user inputs from the client computing system to the host computing system.

FIG. 2 is a block diagram of components that enable transmission of encoded frame data from the host computing system to the client computing system and user inputs from the client computing system to the host computing system. These components include the VM 122 which generates frames of the virtual desktop in response user inputs that are transmitted from the client computing system 200 to the host computing system 100. As frames of the virtual desktop are generated, the VMX process 123 carries out software encoding of the frames using a video encoder 152 and/or hardware encoding of the frames using a video encoder 117 implemented in the GPU 106 (shown in FIG. 3), and a UI remoting (UIR) server 153 transmits the encoded frame data to the client computing system 200. Upon receipt, the client computing system 200 decodes the encoded frame data through a video decoder 252 and displays the decoded frames locally at display of the client computing system 200.

In one embodiment, the functionality of the video encoder 117 is accessed by invoking API (application programming interface) commands that are exposed by a driver for the GPU 106. Thus, when carrying out hardware encoding of the frames using the video encoder 117, the VMX process 123 issues an API command that instructs the video encoder 117 to encode frame data identified in the command and return encoded frame data.

Figure 3:
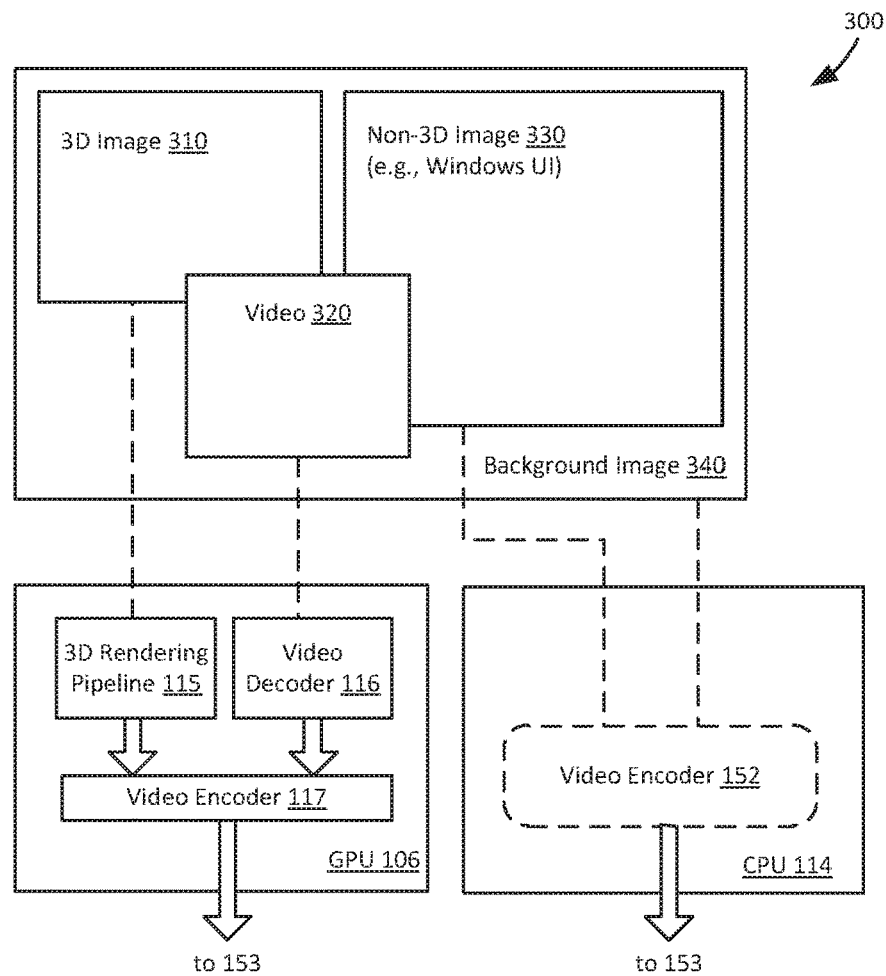
FIG. 3 illustrates an example of a virtual desktop displayed on a client computing system and components for carrying out video encoding according to an embodiment.

FIG. 3 is a conceptual diagram that illustrates frame encoding carried out at the host computing system according to an embodiment. The frame encoding according to the embodiment employs a hybrid approach. Portions of the frame data are encoded in hardware by the GPU 106 by the video encoder 117 and the remaining portions of the frame data are encoded in software by the CPU 114 executing the video encoder 152. The two encoded video streams are transmitted to and displayed at the client computing system 200.

In general, since GPUs can be configured to carry out a specific video encoding, GPUs can carry out the video encoding at a faster rate in comparison to CPUs executing a software video encoder. On the other hand, the software-based CPU encoding is more flexible. Therefore, the hybrid encoding technique according to embodiments combines the strength of both hardware encoding by GPUs and software encoding by CPUs.

One example of the software-based video encoder 152 is VMware Blast®, which is commercially available from VMware, Inc. of Palo Alto, Calif. According to VMware Blast®, the video encoding is carried out using H.264 video encoding for pixel remoting, and a pixel steam is transmitted to the client computing system 200 as a standard video stream. According to H.264 video encoding, pixel data of a portion of a frame that is unchanged from previous frames are reused, and pixel data of a portion a frame that is changed but has been previously encoded are also reused for more efficient encoding. In addition, the video encoding by VMware Blast® includes several optimizations specific to the nature of user interfaces (UIs) that can be included in the virtual desktop. For example, user interface (UI) elements such as text input, scrolling, or pull-down menus tend to result in localized pixel changes, and large portions of a virtual desktop image remain unchanged and do not need to be re-encoded. For each frame, the changed portions are determined and change-map information is used for the frame encoding. For these reasons, the software-based CPU encoding is effective in encoding static portions of a virtual desktop and portions that change in a predetermined manner, such as application UIs. Other specific features that can be achieved by the software-based CPU encoding for the virtual desktop are disclosed in U.S. Patent Publication No. 2014/0029676 and U.S. Patent Publication No. 2014/0176583, and the entire contents of both publications are incorporated herein by reference. The software-based CPU encoding according to the present disclosure is not limited to VMware Blast®, and any appropriate software-based video encoding protocols, including PC over IP (PCoIP) and virtual desktop protocol (RDP), may be employed.

On the other hand, the hardware-based GPU encoding is more effective for 3D applications (e.g., computer-aided design applications, virtual reality (VR) applications, virtual medical operation applications) or video applications (e.g., video streaming applications) in comparison to the above-described software-based CPU encoding. This is because, as set forth above, the GPU can be configured in hardware to operate as a 3D rendering pipeline, a video decoder, and a video encoder. As a result, pixels of 3D images that are generated using the 3D rendering pipeline are readily available for encoding by the video encoder seamlessly. Similarly, pixels of video that are generated using the video decoder are readily available for encoding by the video encoder seamlessly. Some non-limiting examples of the encoding scheme used for hardware-based GPU encoding include H.265 and VP9, both of which are more suitable for encoding 3D images and video, compared to H.264. That is, the encoding scheme for the hardware-based GPU encoding may be different from the one employed for the software-based CPU encoding. As used herein, "3D images" include stereoscopic images. Also, "video" includes video images generated using a video data format, such as MPEG (e.g., H.264, H.265), WMV, VP9, and QuickTime, and are to be distinguished from static images generated using a still image data format, such as JPEG, PDF, and GIF.

In view of such different benefits of the software-based CPU encoding and the hardware-based GPU encoding, one of the software-based CPU encoding and the hardware-based GPU encoding is selectively carried out depending on the type of content to be displayed on the virtual desktop. For example, a portion of each frame of a virtual desktop that corresponds to video or a 3D image is encoded using the hardware-based GPU encoding (i.e., using the GPU 106), and a portion of each frame of the virtual desktop that corresponds to a non-3D image, such as an application UI or a background of the virtual desktop, is encoded using the software-based CPU encoding.

The hybrid encoding approach according to embodiments can be applied to a situation in which the host computing system 100 provides multiple virtual desktops to multiple end users, respectively. In one such example where multiple virtual desktops are generated for multiple end users, the software-based CPU encoding is carried out with respect each virtual desktop that only has 2D images, and the hardware-based GPU encoding is carried out with respect to each virtual desktop that includes video or a 3D image. Alternatively, with respect to each virtual desktop that includes video or a 3D image, the video encoding can be carried out using the hybrid encoding approach, using a combination of the software-based CPU encoding and the hardware-based GPU encoding.

For example, it is assumed that each of the CPUs 114 of the multi-core processor 104 can host multiple end users to generate the virtual desktop through the software-based CPU encoding, as long as the end users use text applications (i.e., ordinary UIs, such as Microsoft Excel, Word, PowerPoint, and Outlook), and not use video or 3D applications. If, no hardware-based GPU encoding is employed and one of the end users starts to use a video or 3D application, the CPU 114 (i.e., the entire single core) may entirely need to operate for that end user to sustain the video decoding or 3D rendering in addition to UI remote encoding, and the remote processing for the other end users may need to slow down or temporarily stop. However, according to the hybrid encoding approach, the additional processing requirement of the end user who started the video or 3D application can be absorbed by the GPU 106, and thus the CPU 114 can continue to host the multiple end users without interruption. For example, an Intel E3 CPU with four x86 cores and an integrated GPU can sustain 28 users (seven users per core), even with use of video or 3D application by the users, because the 3D rendering, video decoding, and video encoding requirements therefor can be absorbed by the GPU. In contrast, without use of the GPU, the seven-user-per-core relationship may need to be compromised even when no end user uses the video or 3D application, because the provisioning ratio needs to be based on worst-case usage scenario (e.g., where all end users use the video or 3D application).

Further, in the example in which the host computing system 100 provides multiple virtual desktops to multiple end users, respectively, the GPU 106 can be allocated among the VMs that are generating the virtual desktop according to processing requirements of the VMs (e.g., frame rates, resolutions, and play lengths). The techniques for allocating the GPU resources among the VMs are disclosed in U.S. Patent Publication No. 2014/017658, U.S. Patent Publication No. 2014/0181806, and U.S. Patent Publication No. 2014/0181807, and the entire contents of each of these applications are incorporated herein by reference.

Figure 4:
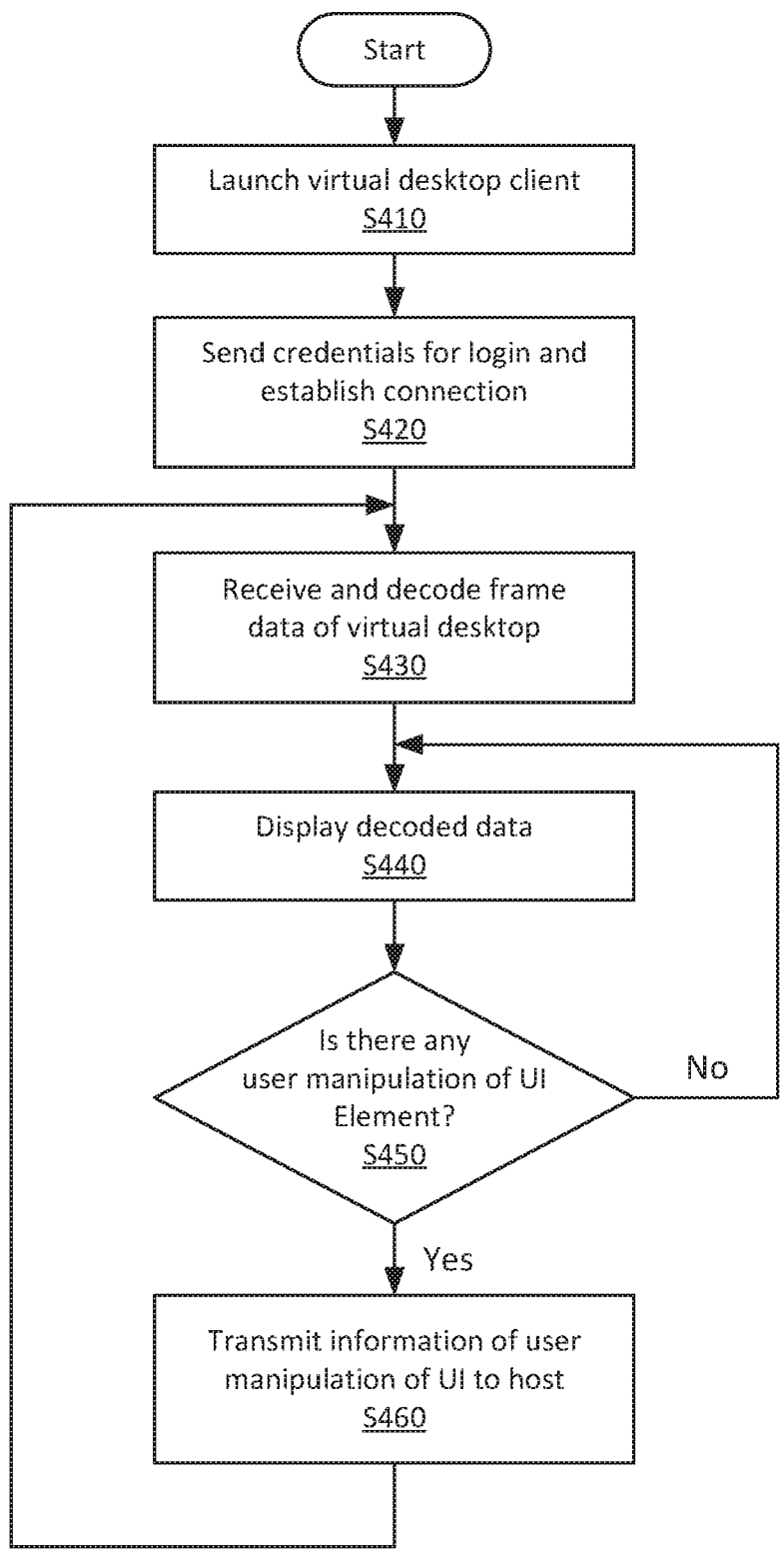
FIG. 4 depicts a flow diagram of an operation carried out at a client computing system to access a virtual machine running on the host computing system and display a virtual desktop generated by the virtual machine on a display of the client computing system.

FIG. 4 depicts a flow diagram of method steps carried out at a client computing system to access a virtual machine running on the host computing system and display a virtual desktop generated by the virtual machine on a display of the client computing system. The method starts at step S410, where the end user launches the virtual desktop at the client computing system 200. At step S420, the client computing system 200 transmits login credentials received from the user to a connection server (not shown) in order to log the user into a VM that is running on the host computing system 100 and hosting the virtual desktop. Then, upon authentication of the login credentials by the connection server, a connection between the client computing system 200 and the VM is established. At step S430, the client computing system 200 receives encoded frame data of the virtual desktop from the host computing system 100 and decodes the received frame data. The client computing system 200 performs the decoding of the received frame data either through software-based CPU decoding or hardware-based GPU decoding (if the GPU is installed in the client computing system) in accordance with the appropriate decoding protocol corresponding to the encoding protocol. For example, when H.264 encoding is employed on the side of the host computing system 100, H.264 decoding is carried out on the side of the client computing system 200.

At step S440, the client computing system 200 displays the virtual desktop using the decoded frame data. At step S450, the client computing system 200 determines whether or not the user has made any inputs to the virtual desktop through input devices of the client computing system 200 (e.g., mouse and/or keyboard). Upon detecting the user inputs (Yes at step S450), the client computing system 200 transmits the user inputs to the host computing system 100 at step S460, and the process returns to step S430. If there are no user inputs (No at step S450), the process returns to S440. Steps S430-S460 are carried out until the user logs out of the VM hosting the virtual desktop.

Figure 5:
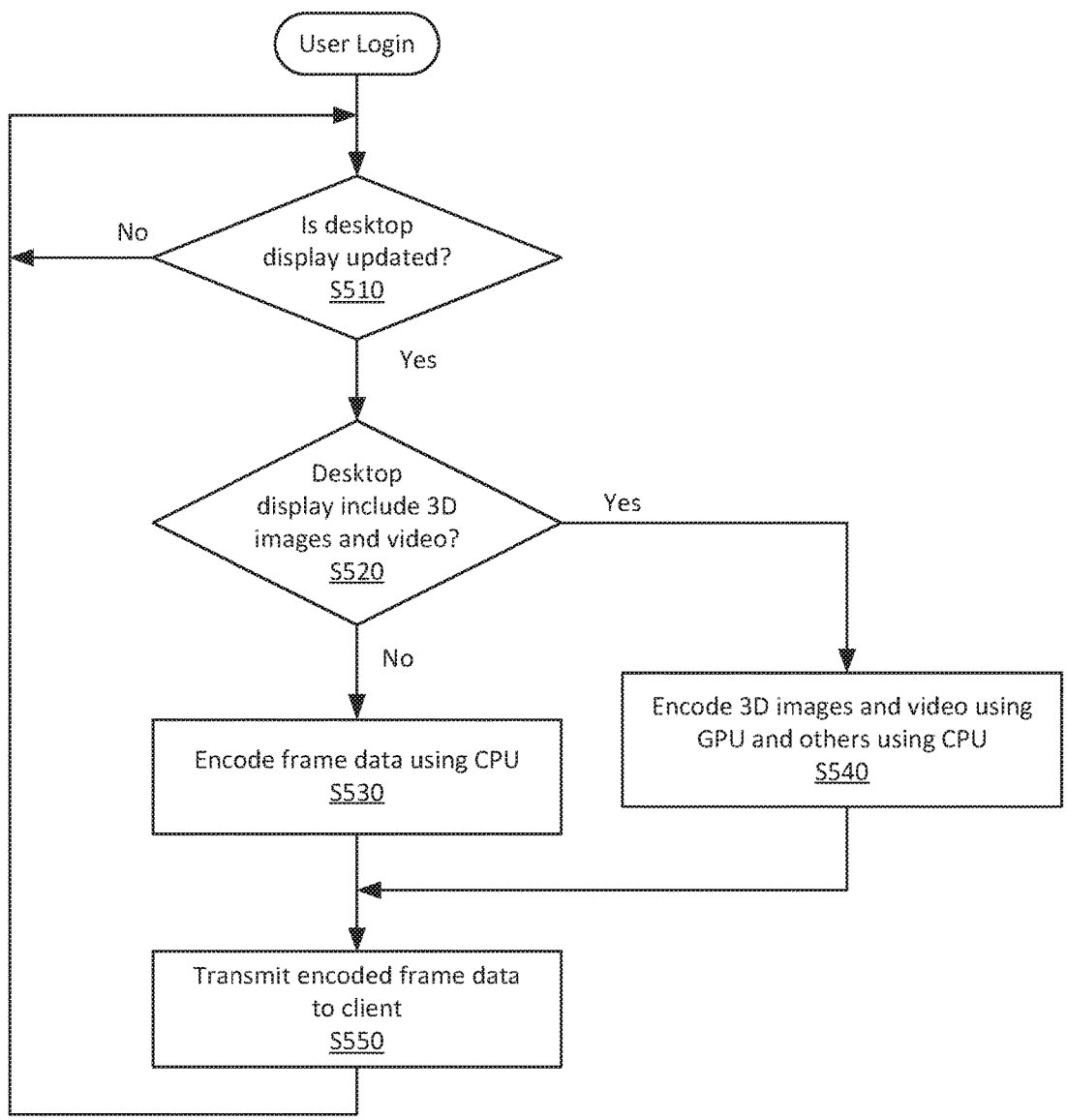
FIG. 5 depicts a flow diagram of a hybrid approach for encoding frames of the virtual desktop according to a first embodiment.

FIG. 5 depicts a flow diagram of a hybrid approach for encoding frames of the virtual desktop according to a first embodiment. The steps illustrated in FIG. 5 are carried out after a user logs into the VM supporting the virtual desktop and a connection is established between the client computing system 200 and the host computing system 100, in particular the VM supporting the virtual desktop.

At step S510, the VMX process 123 checks to see if the virtual desktop has been updated. If the virtual desktop has been updated, the VMX process 123 determines whether or not the updated virtual desktop includes video or a 3D image. If the determination at step S520 is negative (No at step S520), step S530 is executed, where the software video encoder 152 executes encoding of the frame data of the entire virtual desktop using the CPU 114. Then, at step S550, the UIR server 153 transmits the encoded frame data to the client computing system 200 as a video stream, e.g., H.264 encoded stream.

If, on the other hand, the determination at step S520 is positive (Yes at step S520), step S540 is executed, where the VMX process 123 executes hardware encoding of the frame data of the portions of the virtual desktop that includes either video or a 3D image by issuing an API command that instructs the video encoder 117 to encode the frame data containing video data or 3D image data in the video encoder 117 of the GPU 106 and return encoded frame data. In addition, while the hardware encoding is being carried out in the video encoder 117 of the GPU 106, the software video encoder 152 at step S540 executes encoding of the frame data of the remaining portions of the virtual desktop using the CPU 114. Then, at step S550, the UIR server 153 transmits the software encoded frame data and the hardware encoded frame data to the client computing system 200 as two separate video streams. In one embodiment, the two video streams are encoded in the H.264 format. In another embodiment, the two video streams are encoded in different formats, e.g., H.264 format for the software encoded video stream and H.265 format for the hardware encoded video stream.

Figure 6:
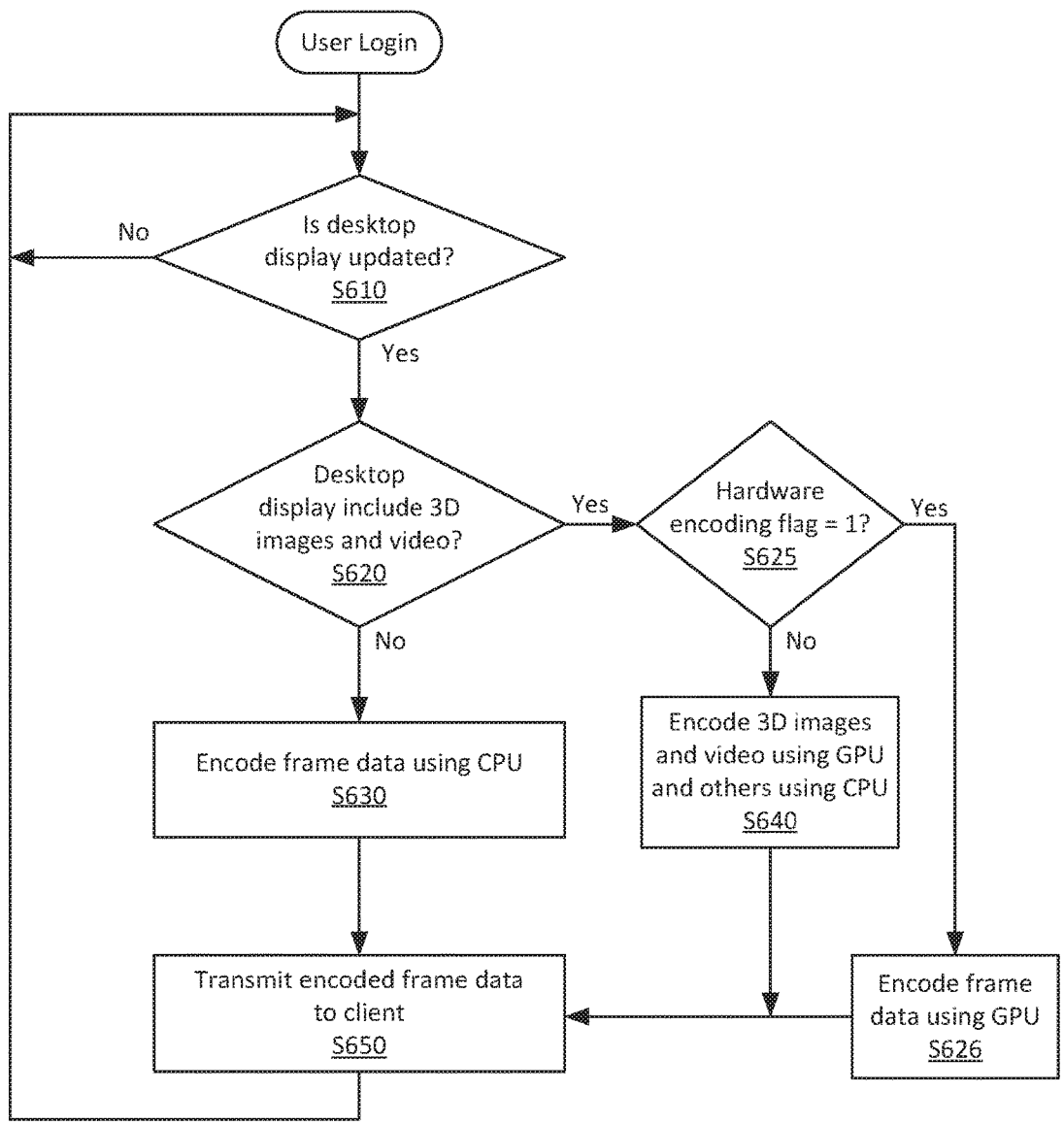
FIG. 6 depicts a flow diagram of a hybrid approach for encoding frames of the virtual desktop according to a second embodiment.

FIG. 6 depicts a flow diagram of a hybrid approach for encoding frames of the virtual desktop according to a second embodiment. The steps illustrated in FIG. 6 are carried out after a user logs into the VM supporting the virtual desktop and a connection is established between the client computing system 200 and the host computing system 100, in particular the VM supporting the virtual desktop.

At step S610, the VMX process 123 checks to see if the virtual desktop has been updated. If the virtual desktop has been updated, the VMX process 123 determines whether or not the updated virtual desktop includes video or a 3D image. If the determination at step S620 is negative (No at step S620), step S630 is executed, where the software video encoder 152 executes encoding of the frame data of the entire virtual desktop using the CPU 114. Then, at step S650, the UIR server 153 transmits the encoded frame data to the client computing system 200 as a video stream, e.g., H.264 encoded stream.

If, on the other hand, the determination at step S620 is positive (Yes at step S620), step S625 is executed, where the VMX process 123 checks the value of a hardware encoding flag. The hardware encoding flag is a user setting that is communicated from the VDI client 220 to the UIR server 153, and is set to 0 or 1. When the flag is set to 1, the hardware encoding is carried out on an all or nothing basis. In other words, if the virtual desktop contains any video or 3D image, hardware encoding is carried out in the video encoder 117 of the GPU 106 on the frame data of the entire virtual desktop. On other hand, when the flag is set to 0, the hardware encoding is carried out in the video encoder 117 of the GPU 106 only on the frame data of portions of the virtual desktop that contains video or 3D image.

Thus, if the hardware encoding flag is set to 1, the VMX process 123 at step S626 executes hardware encoding of the frame data of the entire virtual desktop. On the other hand, if the hardware encoding flag is set to 0, the VMX process 123 at step S640 executes hardware encoding of the frame data of the portions of the virtual desktop that includes either video or a 3D image by issuing an API command that instructs the video encoder 117 to encode the frame data containing video data or 3D image data in the video encoder 117 of the GPU 106 and return encoded frame data. In addition, while the hardware encoding is being carried out in the video encoder 117 of the GPU 106, the software video encoder 152 at step S640 executes encoding of the frame data of the remaining portions of the virtual desktop using the CPU 114. Then, at step S650, the UIR server 153 transmits the hardware encoded frame data to the client computing system 200 as one video stream and the software encoded frame data, if any, as another video stream.

While the foregoing is directed to embodiments of the present invention, other and further embodiments of the invention may be devised without departing from the basic scope thereof. For example, the categorization of tasks to be handled through the software-based CPU encoding and the hardware-based GPU encoding may not be made based on whether or not the task involves the 3D images or video images. Some of 3D images or video images may require only a low frame rate transmission or the resolution of the images may be sufficiently low. Also, in some of 3D images or video images (e.g., security camera images), majority of the images may be unchanged portion, and only a minor portion of the images may changes every frame. In such a case, the encoding of these types of 3D images or video images may be carried out by the software-based CPU encoding. That is, depending on the type of the 3D and video images (e.g., frame rate, resolution, play length, a ratio of changed portion to unchanged portion, and so on), one of the software-based CPU encoding and the hardware-based GPU encoding may be selected.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of encoding frame data of one or more virtual desktops in hardware and in software and transmitting the encoded frame data to one or more client devices, said method comprising:
   determining that a first portion of the frame data contains either a video or a 3D image;
   encoding the first portion of the frame data in hardware to generate a first encoded frame data;
   during encoding of the first portion, encoding a second portion of the frame data in software to generate a second encoded frame data; and
   transmitting the first encoded frame data and the second encoded frame data from a host computer of the one or more virtual desktops to the one or more client devices as separate data streams.

2. The method of claim 1, wherein the host computer includes a central processing unit (CPU) and a graphics processing unit (GPU), and the first portion is encoded in hardware by the GPU and the second portion is encoded by software being executed by the CPU.

3. The method of claim 2, wherein the first and second portions of the frame data are portions of a single virtual desktop.

4. The method of claim 2, wherein the video is decoded in hardware by the GPU and the 3D image is rendered in hardware by the GPU and the decoded video and the rendered 3D image are encoded in hardware by the GPU to generate the first encoded frame data.

5. The method of claim 2, wherein the first and second portions of the frame data are portions of different virtual desktops.

6. The method of claim 5, wherein the different virtual desktops include a first virtual desktop and a second virtual desktop, and the first portion includes frame data of the entire first virtual desktop and the second portion includes frame data of the entire second virtual desktop.

7. The method of claim 1, wherein the encoding of the first and second portions is carried out using the same video encoding format.

8. The method of claim 1, wherein the encoding of the first portion is carried out using a first video encoding format and the encoding of the second portion is carried out using a second video encoding format that is different from the first video encoding format.

9. A non-transitory computer readable medium comprising instructions executable in a host computer in which virtual desktops are running, wherein the instructions when executed in the host computer cause the host computer to perform a method of encoding frame data of one or more of the virtual desktops in hardware and in software and transmitting the encoded frame data to one or more client devices, said method comprising:
   determining that a first portion of the frame data contains either a video or a 3D image;
   encoding the first portion of the frame data in hardware to generate a first encoded frame data;
   during encoding of the first portion, encoding a second portion of the frame data in software to generate a second encoded frame data; and
   transmitting the first encoded frame data and the second encoded frame data from the host computer to the one or more client devices as separate video streams.

10. The non-transitory computer readable medium of claim 9, wherein the host computer includes a central processing unit (CPU) and a graphics processing unit (GPU), and the first portion is encoded in hardware by the GPU and the second portion is encoded by software being executed by the CPU.

11. The non-transitory computer readable medium of claim 10, wherein the first and second portions of the frame data are portions of a single virtual desktop.

12. The non-transitory computer readable medium of claim 10, wherein the video is decoded in hardware by the GPU and the 3D image is rendered in hardware by the GPU and the decoded video and the rendered 3D image are encoded in hardware by the GPU to generate the first encoded frame data.

13. The non-transitory computer readable medium of claim 10, wherein the first and second portions of the frame data are portions of different virtual desktops.

14. The non-transitory computer readable medium of claim 13, wherein the different virtual desktops include a first virtual desktop and a second virtual desktop, and the first portion includes frame data of the entire first virtual desktop and the second portion includes frame data of the entire second virtual desktop.

15. The non-transitory computer readable medium of claim 9, wherein the encoding of the first and second portions is carried out using the same video encoding format.

16. The non-transitory computer readable medium of claim 9, wherein the encoding of the first portion is carried out using a first video encoding format and the encoding of the second portion is carried out using a second video encoding format that is different from the first video encoding format.

17. A computer system connected to a plurality of client devices over a network, the computer system comprising:
   a central processing unit (CPU) programmed to generate frame data of one or more virtual desktops of one or more of the client devices;
   a graphics processing unit (GPU) configured to encode portions of the frame data; and
   a network interface controller (NIC),
   wherein the CPU is programmed to determine that a first portion of the frame data contains either a video or a 3D image, to instruct the GPU to encode the first portion of the frame data in hardware to generate a first encoded frame data, to encode a second portion of the frame data in software to generate a second encoded frame data, and to instruct the NIC to transmit the first encoded frame data and the second encoded frame data to the one or more client devices as separate video streams.

18. The computer system of claim 17, wherein the first and second portions of the frame data are portions of a single virtual desktop, and the first portion of the frame data corresponds to a portion of the virtual desktop that contains either video that is decoded in hardware by the GPU or a 3D image that is rendered in hardware by the GPU and the decoded video or the rendered 3D image is encoded in hardware by the GPU to generate the first encoded frame data.

* * * * *